US00RE38795E

(19) United States
(12) Reissued Patent
Welling et al.

(10) Patent Number: US RE38,795 E
(45) Date of Reissued Patent: Sep. 13, 2005

(54) PATTERN SELECTION METHOD AND APPARATUS

(75) Inventors: Paul C. Welling, Charlestown, NH (US); James L. Stopa, Old Saybrook, CT (US)

(73) Assignee: Whelen Engineering Company, Inc., Chester, CT (US)

(21) Appl. No.: 10/352,362

(22) Filed: Jan. 27, 2003

Related U.S. Patent Documents

Reissue of:
(64) Patent No.: 6,317,052
Issued: Nov. 13, 2001
Appl. No.: 09/553,459
Filed: Apr. 19, 2000

(51) Int. Cl.[7] ..... G08B 3/00
(52) U.S. Cl. ..... 340/691.1; 340/691.3; 340/326; 340/332; 340/471; 340/472; 340/473
(58) Field of Search ..... 340/691.1, 691.3, 340/326, 332, 471, 472, 473

(56) References Cited

U.S. PATENT DOCUMENTS 4,868,540 A 9/1989 Housley ..... 340/326
6,317,052 B1 * 11/2001 Welling et al. ..... 340/691.1

* cited by examiner

*Primary Examiner*—Julie Lieu
(74) *Attorney, Agent, or Firm*—Alix, Yale & Ristas, LLP

(57) ABSTRACT

The duration of variations in the potential applied to a single electrical contact, when compared to a reference potential, are measured and employed to command either incrementing or decrementing of an address. The addresses are associated with a table of instructions and an addressed instruction, when read, will produce a discrete warning signal. A desired one of several light flash or audible patterns may be selected by step-wise scrolling through the table in response to manually varying the contact potential.

23 Claims, 4 Drawing Sheets

PATTERN SELECTION METHOD AND APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a technique which permits step-wise scrolling, selectively in either of two opposite directions, through a plurality of stored patterns and, particularly, to facilitating the selection of the flash pattern to be produced by an emergency vehicle warning light. More specifically, this invention is directed to a one wire control which enables a flash pattern generator to step, in either of two directions, through a table of instructions commensurate with multiple flash patterns. Accordingly, the general objects of the present invention are to provide novel and improved methods and apparatus of such character.

2. Description of the Prior Art

While not limited thereto in its utility, the present invention has been devised for, and is particularly useful in, the selection of a flash pattern to be generated by a high intensity light mounted upon an emergency vehicle. An emergency vehicle warning or signaling light may employ, as the light generator, an incandescent score, a halogen lamp for example, or a gaseous discharge device, i.e., a flash tube or strobe. Such a light generator may also comprise an array of closely spaced light emitting diodes. The control for an emergency vehicle warning light will typically have the capability of causing the generation of a plurality of different flash patterns. These "standard" patterns will be stored in a pattern table as retrievable controller commands.

The operators of emergency vehicles demand the ability to exercise control over the flash pattern produced by their vehicle mounted warning lights. In the prior art the selection of a stored flash pattern often required the vehicle operator to physically access the control for the flash pattern generator and perform some "manipulation", i.e., a circuit modification, and/or required the routing of a multi-conductor cable from the control to a selector module located within the driver's compartment. Manipulative steps such as the setting of multiple dip switches at the typically difficult to reach control, a common prior art method of pattern selection, can not readily be performed in the field. The foregoing problem results from the fact that the flash pattern generator control is typically located remotely from the passenger compartment, in a roof-mounted assembly for example, and hard to access. The use of passenger compartment mounted multi-position selector switches is an equally unsatisfactory manner of addressing the problem of flash pattern variation since the number of available patterns is limited to the relative small number of discrete switch positions and, additionally, the expense and inconvenience of connecting and routing a multi-conductor cable is presented. The use of other more complex means for communicating data between the passenger compartment and pattern generator control, wireless techniques for example, is prohibitively expensive and/or volumetrically inefficient.

It should also be noted that the operating environment of a warning light is relatively harsh. This fact dictates a desire to package flash generator control circuitry in a shock-proof, hermetically sealed manner. Such packaging obviously complicates, and often precludes, access for pattern changing.

To summarize, there has been a long standing desire for an uncomplicated and easily useable method of and apparatus for choosing that one of a plurality of stored command signals which will result in, for example, the production of a desired flashing light pattern.

SUMMARY OF THE INVENTION

The present invention overcomes the above-discussed and other deficiencies and disadvantages of the prior art by providing a pattern selection technique which is responsive to changes in the state of a single electrical terminal. The change in state may, for example, be simply the connection of that single terminal to ground. Thus, a pattern change input to a remotely located pattern generator in accordance with the invention may be delivered via a single conductor.

The technique of the present invention employs the duration of changes in the state of the single input terminal as directional control information to implement stepwise scrolling through the plurality of stored patterns. If the duration of the change of state of the input terminal is between first preselected minimum and maximum values, the stepping will precede in a first direction. If the duration of the change in input terminal state is greater than the first maximum, the stepping will occur in a second, opposite direction. If there are no changes in input terminal state within a time period which exceeds a second maximum duration, for example if the input terminal remains grounded, a command signal commensurate with the pattern stored at the address of the last step in the scrolling through the stored patterns will be retained and used as the input to a light generator controller.

In accordance with a preferred method of practice of the invention, the state of the input terminal may be varied by means of the momentary closure of a normally open switch or by providing a pair of terminals that may be momentarily and easily bridged by a conductor.

Also in accordance with a preferred embodiment of the invention, information commensurate with the predetermined patterns is stored in memory, and a word, i.e., a pointer to the full memory address of stored pattern information, will be incremented or decremented as a function of the time the state of the input terminal deviates from its normal state. Each time the pointer is changed, a test is conducted to see if the new pointer is commensurate with the desired pattern. If test is satisfied, the full address of the newly selected pattern is stored and used.

BRIEF DESCRIPTION OF THE DRAWINGS

The present invention may be better understood, and its numerous objects and advantages will become apparent to those skilled in the art, by reference to the accompanying drawings wherein.

A DETAILED DESCRIPTION OF THE DISCLOSED EMBODIMENT

For purposes of explanation, the invention will be described in the environment of a control for a warning light comprising an array of light emitting diodes. As noted above, the controlled light generator could also be a gaseous discharge tube or a halogen lamp.

Figure 3:
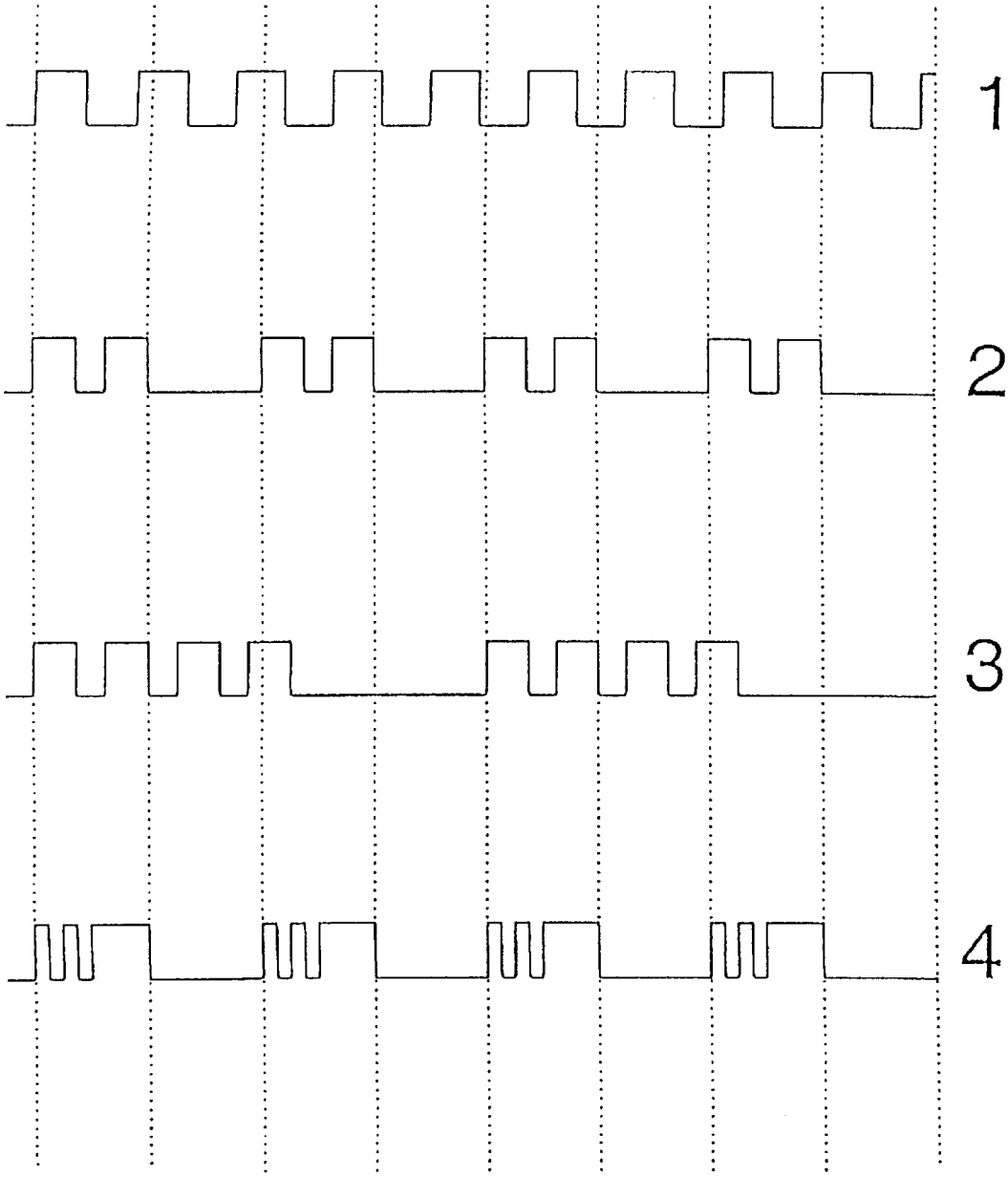
FIG. 3 is a timing diagram illustrating several typical flash patterns obtainable from a warning light, controlled in accordance with the present invention.

FIG. 3 is a timing diagram which represents four (4) different flash patterns which might be available. In actual practice there customarily are at least twelve (12) standard flash patterns available. Information commensurate with these patterns, in the form of command signals, is stored in a non-volatile, addressable, solid state memory, i.e., in ROM, which is integral with a microprocessor. The manner in which the stored information is employed to energize the light generators will be described briefly below.

Figure 1:
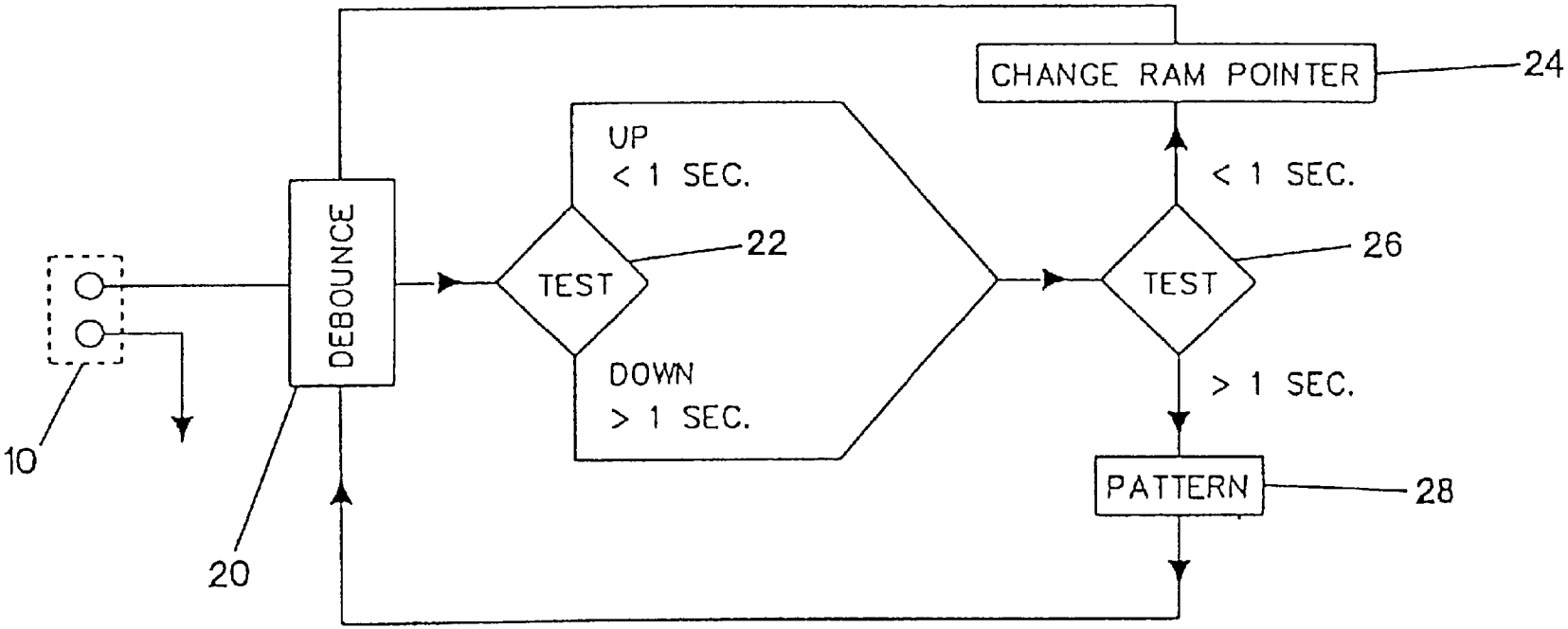
FIG. 1 is a simplified information flow diagram which depicts operation of the invention.
Figure 4:
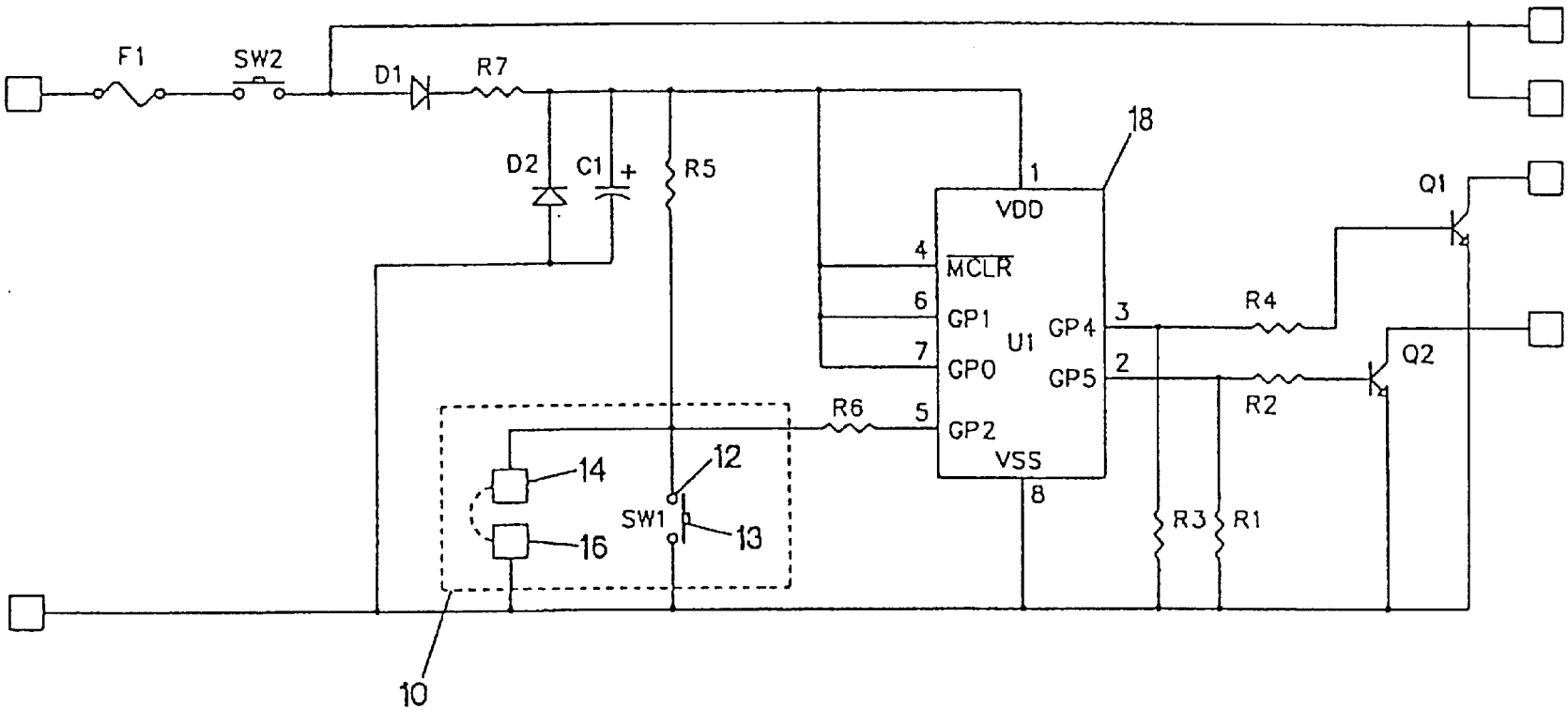
FIG. 4 is an electrical schematic diagram of hardware for implementing a first embodiment of the invention.

User generated input signals, i.e., requests for a change in the flash pattern, are delivered to an input signal generator which is indicated at 10 in FIGS. 1 and 4. The change of pattern requests may most easily be generated simply by the momentary establishment or interruption of a path to ground potential. This may be accomplished, for example, by connecting a first terminal 12 of a double pole switch 13 to ground, the other switch terminal being connected to an input of the flash pattern generator. Alternatively, the input signal may be generated by momentarily placing an electrically conductive object, a coin for example, in contact with a pair of terminals 14 and 16 which are respectively connected to the pattern generator input and ground. There are technically valid and obvious reasons for choosing each of these different approaches to effecting a momentary change of state, typically the electrical grounding, of the input terminal of a flash pattern generator. It will be obvious to those skilled in the art that there are other, more sophisticated, input signal generators 10. Such other input signal generators include optical and RF devices which could be employed to change the state of a single input terminal to generate input control signals for the invention.

An electrical input signal produced by the momentary grounding of either of terminals 12 or 14 will, in the conventional manner, be debounced as indicated by step 20 in FIG. 1. The resultant square wave signal will then be tested, in step 22, to determine if its duration is commensurate with a desire to either increment or decrement an eight (8) bit word, i.e., a pointer, which references the full address, in a pattern table, of the stored flash pattern command. In the simplified example of FIG. 1, an input signal duration of less than one second is commensurate with a desire to increment the pointer whereas an input signal duration in excess of one second is commensurate with a desire to decrement the pointer. The increment/decrement information is employed to move the pointer as indicated at step 24. The time which has elapsed since the last operator produced input control signal is also tested in step 26. As indicated at step 28, the full address of the active pattern will be saved, i.e., stored in a random access memory for use as control information, whenever a preselected time has elapsed since the last pointer change.

Figure 2:
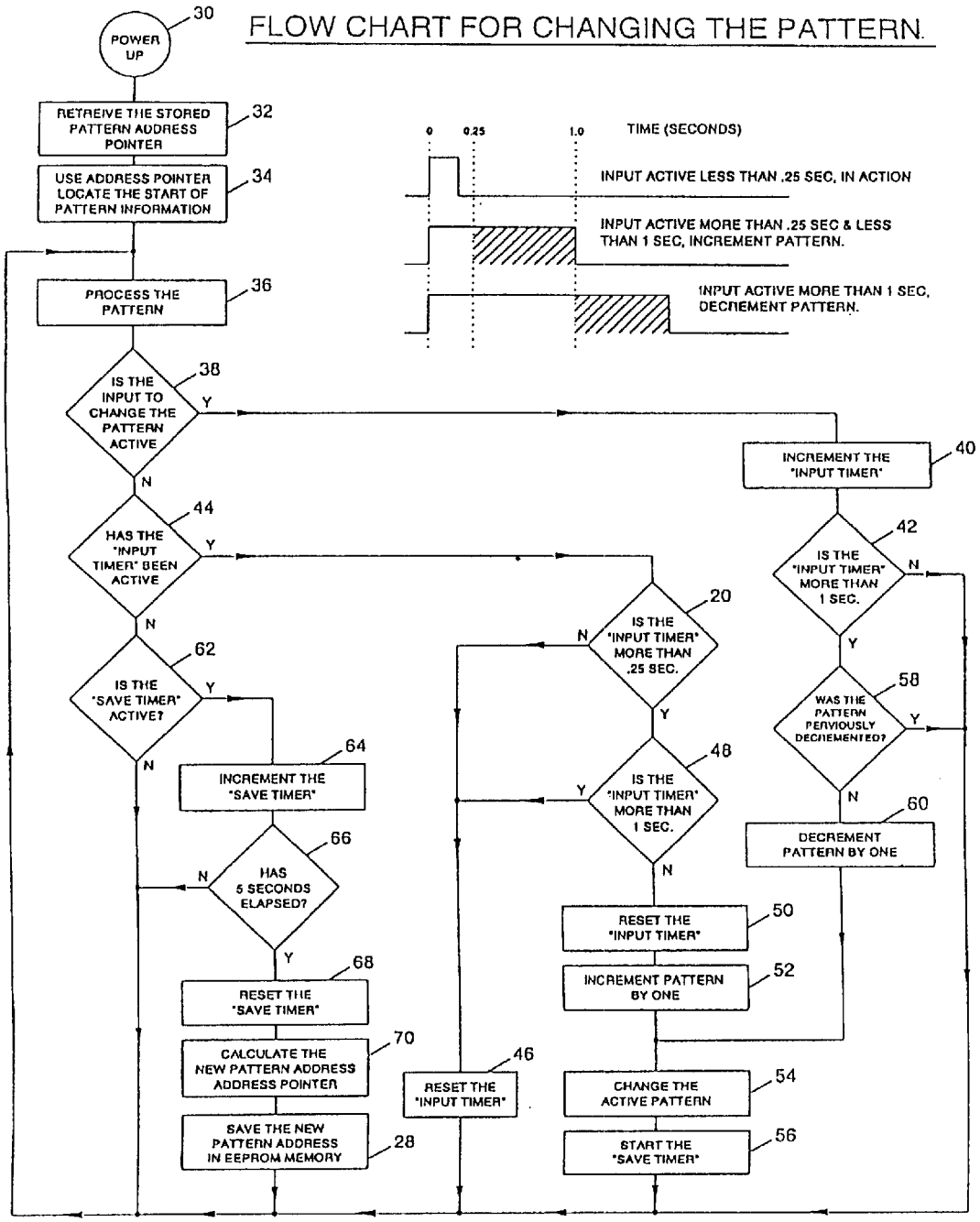
FIG. 2 is an expanded information flow diagram detailing the operation of the invention.

The process represented by FIG. 1, in a preferred embodiment, is implemented in the manner shown in FIG. 2 employing the hardware shown schematically in FIG. 4. With the exception of the generation of the "change pattern" request input signals, implementation of the processes is under the control of instructions stored in a microcontroller 18 which may, for example, comprise a Microchip Technology, Inc. PIC12CE519-04 I/P, including EPROM, EEPROM, RAM, I/O, timer, internal oscillator and watchdog circuit. Upon application of power by the closing of a switch SW1, represented by step 30, the pointer commensurate with the address of the previously active pattern is retrieved from the $E^2$PROM, as indicated by step 32, and stored in RAM. The retrieved pointer is then processed, in step 34, to locate the start of the pattern, information, i.e., the pointer leads to the full address of the pattern. The pattern information is then processed, in step 36, to generate a timing signal, i.e., a train of energization pulses, such as those represented in FIG. 3. The timing signal is utilized as the input to an output control switch, i.e., a switch which controls the flow of energizing current to a controlled light generator. In the FIG. 4 embodiment, a pair of such output control switches, consisting of MOSFETs Q1 and Q2, are shown. If the light generator(s) is a flash tube, the MOSFETs would be replaced by thyristors.

The potential at the control input to microcontroller 18, i.e., the input which is connected to either the ungrounded terminal of switch 12 or terminal 14, is monitored, as indicated by step 38, to determine whether the operator has taken action to request a change in the active flash pattern, i.e., a test is conducted to determine if there is a "change pattern" input. If the potential at the control input terminal of microprocessor 18 has changed, indicative of the closing of switch 12 or established of a short circuit between terminals 14 and 16 of FIG. 4, for example, an input timer will be incremented as indicated at 40. The operation of the input timer will be monitored, as indicated at step 42, to determine whether the "change pattern" input signal has a duration which exceeds a first, predetermined maximum. In the example being described, this first maximum duration is one second.

If the duration of the "change pattern" request is less than one second, i.e., if the result of the test of step 42 is negative, a test 44 will be performed to determine whether the input timer has been active. If this test is answered in the affirmative, the "debounce" step referred to in the discussion of FIG. 1 will be performed. The debouncing step 20 is a test to determine whether the input timer has been active for more than a predetermined minimum time. This minimum time, in the example being described, is one quarter second, i.e., a time sufficient for "noise" associated with a switch closure to subside. If the test of step 20 is answered in the negative, the input timer will be reset, in step 46, and no action will be taken.

If the answer to the test performed in step 20 is in the affirmative, a further test will be performed, in step 48, to determine whether the duration of the "change pattern" request exceeds the previously mentioned first maximum time, i.e., one second in the example being described. If the duration of the "change pattern" request is between one quarter second and one second, the input timer will be reset, in step 50, and the eight (8) bit word comprising the pointer will be incremented one step. The incrementing of the pointer will be accomplished by changing the address of the EPROM in which the pointers are stored. This process is represented as step 52. The incrementing of the pointer will, of course, change the active flash pattern, as indicated by step 54, and will start a "save" timer as indicated at 56.

If the result of test step 48 is affirmative, i.e., if duration of the "change pattern" input is greater than one second, the input timer will be reset, see step 46, and all flags will be cleared. Also, if the pointer address has not already been decremented in response to the existing "change pattern" request, the pattern will be decremented by one step and a "decrement" flag will be set. The test to determine whether the pointer address has previously been decremented is represented by step 58. The step of decrementing the pointer address, i.e., moving the pointer one step in a direction opposite to that which would result from a negative answer in step 48, is represented by step 60. Step 58 guarantees that the pattern generator decrements only once per input activation. If the answer to the test performed in step 58 is affirmative, indicative for example of a relatively long term shorting of the "change pattern" request input terminal to ground, no additional action will be taken.

If an input signal indicative of a desired to change the active pattern has not been present, i.e., if the tests of both of steps 38 and 44 are answered in the negative, and the input timer has not been active, a test 62 is performed to determine whether the "save" timer is active, i.e., if step 56 has been performed. If the "save" timer is not active, nothing further is done. However, if the "save" timer is active, thus indicating that the pointer has been either incremented or decremented one step, the "save" timer is itself incremented in step 64. If more than five (5) seconds have elapsed since the performance of step 64, i.e., if test 66 is answered in the affirmative, the "save" timer is reset in step 68.

Upon the resetting of the "save" timer, the full address of the new pattern is determined, i.e., the pattern address commensurate with the existing pointer will be calculated in step 78, and that new pattern address will be stored in the $E^2$ PROM memory in step 28. The new pattern will then be processed, as described above, and a pulse train such as one of those indicated in FIG. 3 will be outputted by microcontroller 18 to control the closing of a solid state switch, such as switches Q1 and Q2, to thereby energize a light generator and produce a repetitive pattern of light pulses, i.e., flashes.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A method for varying the discernable information produced by a warning device, instructions commensurate with a predetermined number of different human sensory system stimulation patterns being stored in memory at sequentially addressable locations, said method comprising the steps of:

generating an address signal which corresponds to the memory location of the instruction commensurate with the active warning pattern;

employing the generated address signal to retrieve the instruction commensurate therewith;

using the retrieved instruction to control the periodic energization of an energy radiator of a warning device;

monitoring the state of an electrical contact, the contact having applied thereto a first normal potential corresponding to a first state and a second potential corresponding to a second state, the second potential being indicative of a desire to vary the warning pattern;

measuring the duration of each application of said second potential to the monitored contact;

changing the generated address signal when the measured time is less than said first duration, the address signal being either incremented or decremented as a function of whether the measured time has exceeded the first duration to provide a new address signal;

employing the new address signal to retrieve a new instruction commensurate therewith; and using the retrieved new instruction to control the periodic energization of the radiator of the warning device.

2. The method of claim 1, wherein the step of changing the generated address signal when the measured duration is less than the first duration comprises varying the address signal by a single step in a first direction when the measured duration is greater than a second duration but less than the first duration, the second duration being a time period which is less than the first duration.

3. The method of claim 1, wherein the said step of generating an address signal comprises:

producing a pointer which may be incremented or decremented in step-wise fashion; and wherein said steps of changing the generated address signal comprise:

causing a change to the [to the] pointer.

4. The method of claim 3, wherein the step of changing the generated address signal when the measured duration is less than the first duration comprises:

stepping the pointer in a first direction when the measured duration is greater than a second duration but less than the first duration, the second duration being a time period which is less than the first duration.

5. The method of claim 4, wherein the step causing a change to the pointer when the measured time exceeds a first duration comprises:

decrementing the pointer.

6. The method of claim 1, wherein the discernable information is embodied in a visually observable flash pattern and wherein the step of employing the new address signal to retrieve a pattern instruction includes:

determining the elapsed time since the last change of state of the monitored contact; and employing the new address signal to retrieve an instruction if there have been no changes in contact state for a time duration which exceeds a second duration which is greater than the first duration.

7. The method of claim 1, wherein the step of generating an address signal comprises:

producing a digitized numerical pointer which references the full address, in a pattern table, of an instruction commensurate with a pattern; and identifying and reading the full address of the pattern which corresponds to the pointer pattern.

8. The method of claim 1, wherein the second potential is ground potential and wherein said method further comprises the step of:

connecting the monitored electrical contact to ground potential in order to generate a change pattern command, the duration of such commands being measured in said step of measuring.

9. The method of claim 7, wherein said steps of changing the address signal each comprise:

causing a step-wise change in the pointer.

10. The method of claim 9, wherein the discernable information is embodied in a visually observable flash pattern and wherein the step of employing the new address signal to retrieve a pattern instruction includes:

determining the elapsed time since the last change of state of the monitored contact; and employing the new address signal to retrieve an instruction if there have been no changes in contact state for a time duration which exceeds a second duration which is greater than the first duration.

11. The method of claim 10, wherein the step of changing the generated address signal when the measured duration is less than the first duration comprises:

stepping the pointer in a first direction when the measured duration is greater than a third duration but less than the first duration, the third duration being a time period which is less than the first duration.

12. The method of claim 11, wherein the step causing a change to the pointer when the measured time exceeds a first duration comprises:

decrementing the pointer.

13. The method of claim 12, wherein the second potential is ground potential and wherein said method further comprises the step of:

connecting the monitored electrical contact to ground potential in order to generate a change pattern command, the duration of such commands being measured in said step of measuring.

*14. A method for varying the discernable information produced by a warning device, instructions commensurate with a predetermined number of different human sensory system stimulation patterns being stored in addressable memory locations, said method comprising the steps of:*

*generating an address signal which corresponds to the memory location of the instruction commensurate with an active warning pattern;*

*employing the generated address signal to retrieve the instruction;*

*using the retrieved instruction to control the periodic energization of an energy radiator of a warning device;*

*monitoring the state of an electrical contact, the contact having applied thereto a first normal potential corresponding to a first state and a second potential corresponding to a second state, the second potential being indicative of a desire to vary the warning pattern;*

*changing the generated address signal to a new address signal when said second potential is applied to the monitored electrical contact;*

*employing the new address signal to retrieve a new instruction; and*

*using the new instruction to control the periodic energization of the radiator of the warning device.*

*15. The method of claim 14, comprising the step of:*

*measuring a duration of each application of said second potential to the monitored contact;*

*wherein the step of changing comprises:*

*incrementing or decrementing the generated address signal as a function of the measured duration.*

*16. The method of claim 15, wherein the step of changing comprises:*

*making no change to the generated address signal if the measured duration does not exceed a first duration;*

*incrementing the generated address signal by a single step when the measured duration is greater than the first duration but less than a second duration; or*

*decrementing the generated address signal by a single step when the measured duration is greater than the second duration.*

*17. The method of claim 14, wherein generating an address signal comprises:*

*producing a pointer which may be incremented or decremented in step-wise fashion; and*

*wherein said step of incrementing or decrementing comprises;*

*causing a change to the pointer.*

*18. The method of claim 14, wherein the second potential is ground potential and wherein said method comprises:*

*connecting the monitored electrical contact to ground potential to generate a change pattern command.*

*19. The method of claim 15, wherein the second potential is ground potential and wherein said method comprises:*

*connecting the monitored electrical contact to ground potential to generate a change pattern command, the duration of the change pattern command being measured in said step of measuring.*

*20. A circuit for applying an energy pattern to a radiator of a warning device comprising:*

*a programmable microcontroller, said microcontroller comprising:*

*memory for storing an operating program and comprising a plurality of addressable memory locations;*

*a plurality of instruction sets stored in the plurality of addressable memory locations, each instruction set corresponding to a different pattern of energy to be applied to the radiator under the direction of the controller to produce a human sensory stimulation pattern; and*

*a monitored electrical terminal having applied thereto a first normal potential corresponding to a first state;*

*wherein the microcontroller operating program retrieves an active instruction set and applies the energy pattern corresponding to the active instruction set to the radiator, the operating program being responsive to application of a second potential to the monitored electrical contact to select another of said instruction sets as the active instruction set.*

*21. The warning device of claim 20, wherein addresses corresponding to said plurality of addressable memory locations are stored in a table, each address in the table associated with a pointer, said operating program retrieving the active instruction set according to an address indicated by the pointer and selecting another of said instruction sets by changing the pointer.*

*22. The warning device of claim 21, wherein the pointers comprise a sequence of binary numbers and changing the pointer comprises incrementing or decrementing the binary number.*

*23. The warning device of claim 21, wherein said operating program measures the duration of said application of a second potential to the monitored electrical contact and changes the pointer as a function of the duration of said application.*

* * * * *